(12) United States Patent
Wang et al.

(10) Patent No.: US 9,897,876 B2
(45) Date of Patent: Feb. 20, 2018

(54) DISPLAY SUBSTRATE AND METHOD OF MANUFACTURING THE SAME, DISPLAY DEVICE

(71) Applicants: BOE TECHNOLOGY GROUP CO., LTD., Beijing (CN); Ordos Yuansheng Optoelectronics Co., Ltd., Ordos, Inner Mongolia (CN)

(72) Inventors: Li Wang, Beijing (CN); Baojie Zhao, Beijing (CN); Jiabin Cui, Beijing (CN)

(73) Assignees: BOE TECHNOLOGY GROUP CO., LTD., Beijing (CN); Ordos Yuansheng Optoelectronics Co., Ltd., Ordos, Inner Mongolia (CN)

( * ) Notice: Subject to any disclaimer, the term of this patent is extended or adjusted under 35 U.S.C. 154(b) by 86 days.

(21) Appl. No.: 15/214,384

(22) Filed: Jul. 19, 2016

(65) Prior Publication Data

US 2017/0192320 A1 Jul. 6, 2017

(30) Foreign Application Priority Data

Jan. 4, 2016 (CN) .......................... 2016 1 0004882

(51) Int. Cl.
*G02F 1/1362* (2006.01)
*G02F 1/1368* (2006.01)
*G02F 1/1333* (2006.01)

(52) U.S. Cl.
CPC ...... *G02F 1/136209* (2013.01); *G02F 1/1333* (2013.01); *G02F 1/1368* (2013.01); *G02F 2001/133354* (2013.01); *G02F 2001/136222* (2013.01)

(58) Field of Classification Search
CPC .......................................... G02F 2001/136222
See application file for complete search history.

(56) References Cited

U.S. PATENT DOCUMENTS

| | | | | |
|---|---|---|---|---|
| 9,766,521 | B2 * | 9/2017 | Xiong | G02F 1/136209 |
| 2013/0128193 | A1 * | 5/2013 | Yang | G02F 1/133502 |
| | | | | 349/106 |
| 2015/0131017 | A1 * | 5/2015 | Ro | G02F 1/133345 |
| | | | | 349/42 |
| 2015/0185530 | A1 * | 7/2015 | Fu | G02F 1/1336 |
| | | | | 349/48 |

FOREIGN PATENT DOCUMENTS

CN 104777664 A 7/2015

* cited by examiner

*Primary Examiner* — Nathanael R Briggs
*Assistant Examiner* — Alexander Gross
(74) *Attorney, Agent, or Firm* — Kinney & Lange, P.A.

(57) ABSTRACT

A display substrate and a method of manufacturing the same, and a display device, are disclosed. The display substrate includes a control portion and a color portion, the control portion and the color portion both including position aligning regions at corresponding positions and further including position aligning marks provided in the position aligning regions. The black matrix is located on top of the color portion and at least the position aligning marks in the color filter layer are formed in a hollowed-out structure. The position aligning marks has an increased level drop or height difference, such that more accurate position alignment may be achieved by identifying the position aligning marks based on height difference at edge of standard pattern.

11 Claims, 4 Drawing Sheets

DISPLAY SUBSTRATE AND METHOD OF MANUFACTURING THE SAME, DISPLAY DEVICE

CROSS-REFERENCE TO RELATED APPLICATIONS

This application claims priority of Chinese Patent Application No. 201610004882.8, filed Jan. 4, 2016, entitled "Display substrate and method of manufacturing the same and display device", which is incorporated herein by reference in its entirety.

BACKGROUND OF THE INVENTION

Field of the Invention

The invention relates to field of display technology, and particularly to a display substrate and a method of manufacturing the same, a display device.

Description of the Related Art

Traditional processes of manufacturing a liquid crystal panel generally comprise forming an array of thin film transistors (TFT) on an array substrate and forming a black matrix and a color filter layer on a color filter substrate and then assembling them to form a cell and finally packaging the cell. The black matrix is provided for separating the adjacent portions of the color filter layer to form sub-pixels, preventing color mixture or light leak. If the cell assembling process is not accurate such that the thin film transistor is not aligned with the color filter layer, several undesirable effects will be caused.

With the development of the liquid crystal display industry, a Color filter On Array (COA) technology gradually has become mature, in which technology the black matrix and the color filter layer which are conventionally formed on the color filter substrate are transferred to the array substrate, thus the problem arising from poor accuracy of the cell assembling process can be fundamentally solved, and there are further advantageous effects including improvement of aperture ratio and quality of the display panel, etc.

However, it is difficult to identify the position aligning marks during exposing, if the black matrix is formed on the array substrate rather than on the color filter substrate, because the black matrix is made of a material with high optical density and is hard to be identified. In this instance, it is hard to align a mask during exposure. If the black matrix is made of a material with a low optical density, the light shielding effect is degraded although the discrimination of the position aligning marks may be improved. FIG. 1A is a schematic plan view of a display substrate coated with a film 50 of a black matrix and FIG. 1B is a cross section view of a position aligning region in a square shape shown in FIG. 1A, taken along line A-A. From FIGS. 1A and 1B, it can be seen that the film 50 of the black matrix completely covers the position aligning marks 2 after coated on the array substrate. As the film 50 has a typical thickness of 1 μm, the level drop or height difference between the position aligning marks 2 that have been covered by the film 50 of the black matrix and the layers therearound is reduced, such that the position aligning marks are hard to be identified using a surface profile detecting method.

It is needed to provide a display substrate in COA structure that may solve the problem in prior art and achieves convenient and accurate position alignment.

SUMMARY OF THE INVENTION

Embodiments of the present invention solve at least some defects in prior arts and provide a display substrate and a method of manufacturing the same, and a display device, in which position aligning marks of the display substrate introduce a relative great level drop or height difference such that position alignment may be achieved by identifying the position aligning marks based on height difference at edge of a standard pattern, thereby solving difficulty in aligning position of the black matrix in COA technique in prior arts and ensuring accurate position alignment of a sub-pixel.

The embodiments of the invention that solve the problem in the prior art provide a display substrate, comprising a control portion and a color portion that is disposed over the control portion and comprises a color filter layer and a black matrix, the control portion and the color portion both comprising position aligning regions at corresponding position and further comprising position aligning marks at the position aligning regions, wherein the black matrix is located on top of the color portion and at least the position aligning marks in the color filter layer of the color portion are formed in a hollowed-out structure.

In an embodiment, a thickness of a part of the color portion at the position aligning mark with the hollowed-out structure is half of an overall thickness of the color portion.

In an embodiment, the thickness of the part of the color portion at the position aligning mark with the hollowed-out structure is greater than 3 μm.

In an embodiment, the display substrate further comprises an additional layer that comprises a planarization layer arranged between the color filter layer and the black matrix, the planarization layer comprising position aligning marks with the hollowed-out structure.

In an embodiment, a thickness of the color filter layer is in a range from 2 μm to 3 μm, a thickness of the black matrix is in a range from 0.8 μm to 1.2 μm and a thickness of the planarization layer is greater than 2.5 μm.

In an embodiment, hollowed-out structure of the position aligning marks have a cruciform shape or T-shaped shape, viewed in a direction perpendicular to the color filter layer.

In an embodiment, the black matrix is made of resin material with a high optical density, which is in a range greater than or equal to 4.

In an embodiment, the control portion comprises a thin film transistor having a multilayer layered structure, the multilayer layered structure being formed by providing patterns of respective layers successively through patterning processes by aligning the respective layers by means of the position aligning marks.

Embodiments of the present invention provide a method of manufacturing a display substrate comprising:

forming a reference layer on a substrate and forming a pattern including reference position aligning marks by the reference layer;

forming a pattern of a color filter layer on the substrate, on which the reference position aligning marks are formed, and the pattern of the color filter layer includes position aligning marks corresponding to the reference position aligning marks, the position aligning marks of the color filter layer being formed in a hollowed-out structure;

forming a pattern of black matrix on the substrate, on which the color filter layer is formed, wherein a material for forming the black matrix is filled into hollowed-out structure of the position aligning marks of the color filter layer such that the position aligning marks are capable of being identified and by a profile detecting method during exposure process and alignment is performed.

In an embodiment, the method further includes a step of forming a planarization layer between step 2) and step 3), the planarization layer comprising position aligning marks corresponding to the reference position aligning marks and formed in a hollowed-out structure.

Embodiment of the present invention provides a display device, comprising the display substrate as described above.

REFERENCE NUMBER LIST array substrate; 2—reference position aligning mark;
21—position aligning mark; 20—position aligning region;
3—color filter layer; 30—film of the color filter layer;
4—planarization layer; 40—film of the planarization layer;
5—black matrix; 50—film of the black matrix

DETAILED DESCRIPTION OF PREFERRED EMBODIMENTS OF THE INVENTION

A display substrate and a method of manufacturing the same, and a display device according to the present invention will be further described in detailed with reference to embodiments and accompanying drawings, in order to make the object, schemes and advantages of the present invention more clear.

Color filter On Array (COA) technology aims to integrate multiple layers which are conventionally formed on an color filter substrate into an array substrate so as to relieve signal delay in metal wire and improve display performance of a display panel/device, etc.

The embodiment at least may solve the problem in the Color filter On Array technology that position aligning marks cannot be identified after a black matrix has been formed on the array substrate. The embodiment provides a display substrate and a method of manufacturing the same, in which position aligning marks are included and may be identified after a black matrix has been formed, and which thus effectively solve the problem in the Color filter On Array technology that the black matrix may not be accurately aligned. In the display substrate according to the embodiments, layered structure which is conventionally formed on a color filter substrate is directly formed on an array substrate that has been prepared. The detail of the array substrate may be referred to those in prior arts and is not defined here, and thus is neither described in the specification nor shown in drawings.

Figure 5A:
FIG. 5A is a schematic plan view of a display substrate according to embodiment 1, formed with a film of a black matrix.
Figure 5B:
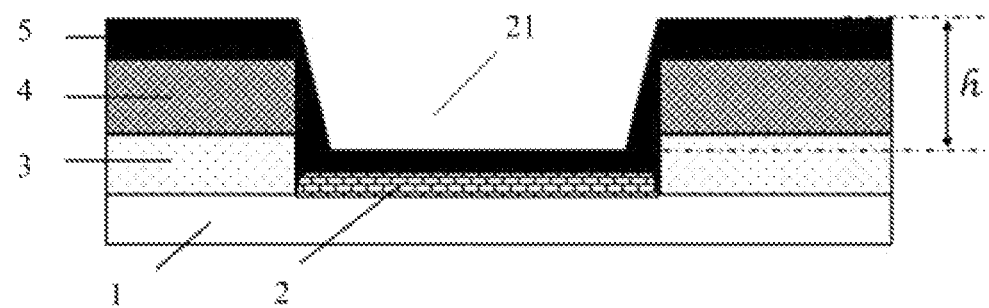
FIG. 5B is a cross section view of a position aligning region in FIG. 5A, taken along A-A line.

The embodiment provides a display substrate comprising a control portion and a color portion that is disposed over the control portion and comprises a color filter layer and a black matrix. The control portion and the color portion both comprise position aligning regions where position aligning marks are provided. The position aligning regions are generally arranged at corners of a non-display region. As shown in FIGS. 5A and 5B, the black matrix 5 is located on top of the color portion. At least the color filter layer 3 of the color portion comprises position aligning marks 21 in a hollowed-out structure.

Preferably, a thickness of a part of the color portion at the position aligning mark 21 with the hollowed-out structure is at least half of an overall thickness of the color portion. For example, the thickness of the part of the color portion at the position aligning mark with the hollowed-out structure is greater than 3 µm.

In the embodiment, the color filter layer 3 has a thickness in a range from 2 µm to 3 µm (it is possible as long as the thickness is greater than 2 µm), the black matrix 5 has a thickness in a range from 0.8 µm to 1.2 µm. Generally, the thickness of the color filter layer 3 is relatively greater and hollowed-out position aligning marks having a cruciform shape or T-shaped shape are formed at least in the color filter layer 3 to ensure a level drop or height difference between the hollowed-out position aligning marks and layers therearound.

Preferably, the display substrate includes additional layers that comprise a planarization layer 4 arranged between the color filter layer 3 and the black matrix 5. The planarization layer 4 includes position aligning marks 21 in a hollowed-out structure. In prior arts, since a flattening effect on the color filter layer 3 is not considered when the planarization layer 4 is formed on the protruded color filter layer 3 during manufacturing a display substrate, the level drop between the protruded color filter layer 3 and the position aligning marks 21 is decreased to a value out of the detectable accuracy rating range of the surface profile detecting method. In the display substrate of the embodiment, preferably, the planarization layer 4 is also provided with corresponding position aligning marks 21 with the hollowed-out structure to increase the level drop at the position aligning marks. In an example, the planarization layer 4 has a thickness greater than 2.5 µm.

In the above display substrate, due to the increased level drop of the position aligning marks relative to the layered structure therearound, more accurate position alignment may be achieved during formation of the film of the black matrix and pattern of the same, ensuring size and positioning of sub-pixel.

Correspondingly, the embodiment further provides a method of manufacturing a display substrate, which includes steps of:

forming a reference layer on a substrate and forming a pattern comprising reference position aligning marks 2 in the reference layer. Herein, the reference layer may be any type of layer of the display substrate before process of manufacturing a color filter layer.

forming a pattern including a color filter layer 3 on the substrate, on which the reference position aligning marks 2 are formed, the pattern including the color filter layer 3 having position aligning marks 21 corresponding to the reference position aligning marks 2, the position aligning marks 21 in the color filter layer 3 being in a hollowed-out structure.

forming a pattern of black matrix 5 on the substrate, on which the color filter layer 3 is formed, wherein a material for forming the black matrix 5 is filled into the hollowed-out structure of the position aligning marks 21 in the pattern of the color filter layer such that the position aligning marks 21 may be identified by a profile detecting method during exposure process, and alignment is performed.

In the method of manufacturing the display substrate, in which the additional layer includes the planarization layer 4, a step of forming the planarization layer 4 is included between step 2) and step 3). The planarization layer 4 includes position aligning marks 21 corresponding to the reference position aligning marks 2 and formed in a hollowed-out structure. Provision of the position aligning marks 21 with the hollowed-out structure in the planarization layer 4 further increases a height of the hollowed-out structure so as to form a larger level drop, thereby ensuring position aligning effect during surface profile detection.

In the embodiment, the planarization layer 4 has a thickness greater than 2.5 µm. The position aligning marks 21 in hollowed-out structure in the pattern of the color filter layer 3 and those in the planarization layer 4 have the same shape and the same dimension (orientated in a horizontal plane).

Figure 1A:
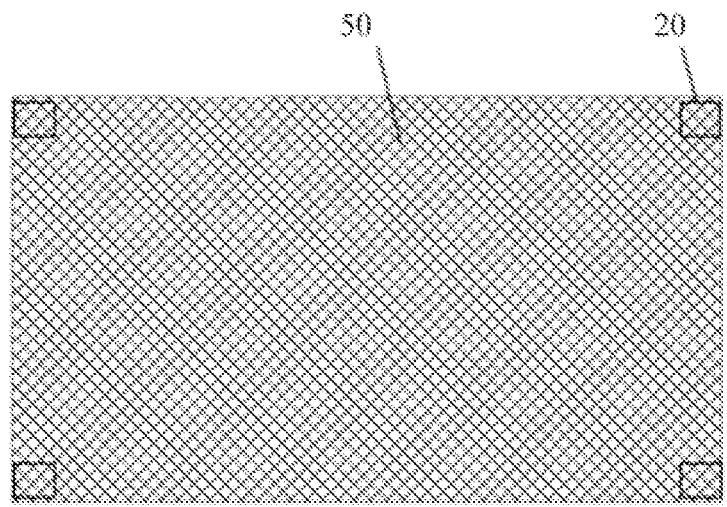
FIG. 1A is a schematic plan view of a display substrate coated with a film of a black matrix in prior arts.
Figure 1B:
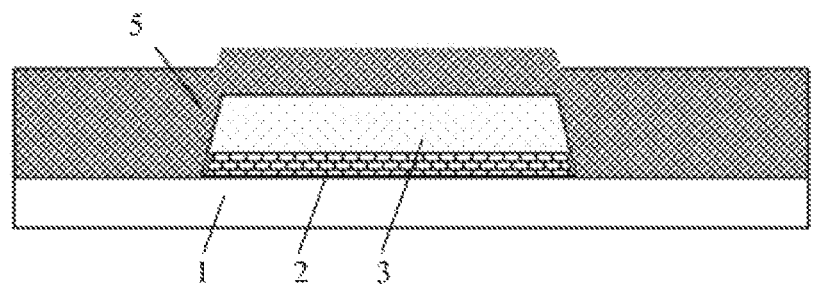
FIG. 1B is a cross section view of a position aligning region shown in FIG. 1A, taken along line A-A.
Figure 2A:
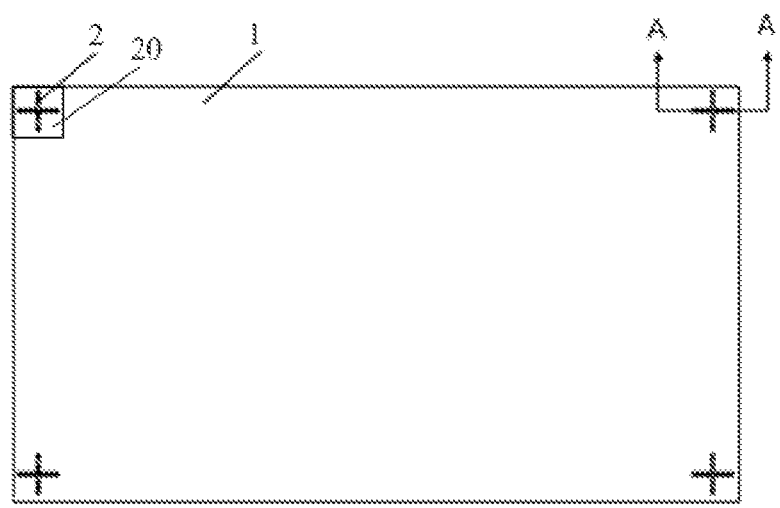
FIG. 2A is a schematic plan view of a display substrate according to embodiment 1, formed with position aligning marks.

Preferably, the position aligning marks 21 in hollowed-out structure have a cruciform shape or T-shaped shape as shown in FIG. 2A, when viewed in a direction perpendicular to the paper plane as shown in FIG. 5 or in a direction perpendicular to the color filter layer.

Preferably, the black matrix 5 is made of a material with a high optical density, which is in a range greater than or equal to 4, such that the optical density of the black matrix is not degraded and the light shielding effect of the black matrix is maintained.

Figure 2B:
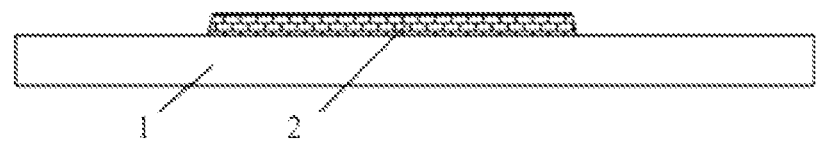
FIG. 2B is a cross section view of a position aligning region shown in FIG. 2A, taken along line A-A.

Specifically, the process of manufacturing the display substrate is described with reference to FIGS. 2A~5B as below:

as shown in FIGS. 2A and 2B, a reference layer (with a thickness smaller than 0.5 µm) is formed on a substrate and then reference position aligning marks 2 are formed through a patterning process. The position aligning marks 2 may be exemplarily formed in a cruciform shape or T-shaped shape. In the structure of the display substrate as shown in FIG. 2B, a structure of the position aligning region includes an array substrate 1 and the reference position aligning marks 2. The reference layer here is used for, after film formation, forming the reference position aligning marks through a patterning process. In an example, with reference to the array substrate 1 in FIGS. 2A~5B, the reference layer is not formed separately and position aligning marks formed in any of a plurality of layers of the thin film transistor in the control portion of the array substrate 1 may be considered as the reference position aligning marks 2.

Figure 3A:
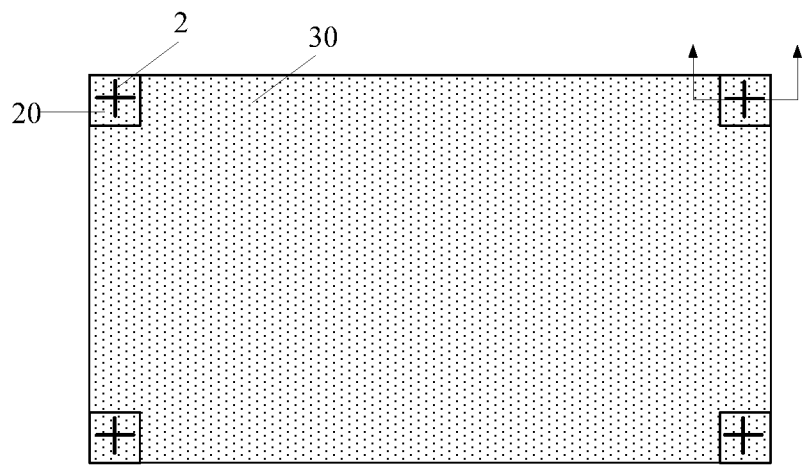
FIG. 3A is a schematic plan view of a display substrate according to embodiment 1, formed with a film of a color filter layer.
Figure 3B:
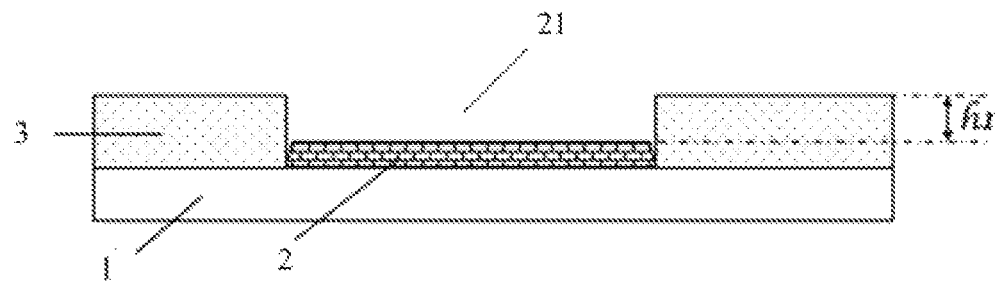
FIG. 3B is a cross section view of a position aligning region in FIG. 3A, taken along line A-A.

As shown in FIGS. 3A and 3B, a film 30 (with a thickness greater than 2 µm) of a color film layer is coated on the array substrate 1, on which the reference position aligning marks 2 are formed, and a pattern of color filter layer 3 and a pattern of the position aligning marks 21 are formed, in which the position aligning marks 21 in the color filter layer 3 are in a hollowed-out structure such that they are accurately aligned with the reference position aligning marks 2. The display substrate shown in FIG. 3B has a structure including the array substrate 1, the reference position aligning marks 2 and the color filter layer 3, which define hollowed-out position aligning marks 21 with a depth of h1.

Figure 4A:
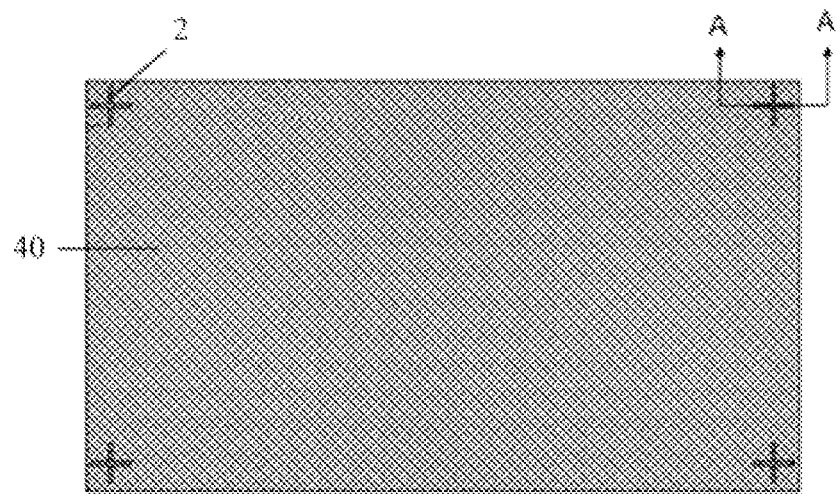
FIG. 4A is a schematic plan view of a display substrate according to embodiment 1, formed with a film of a planarization layer.
Figure 4B:
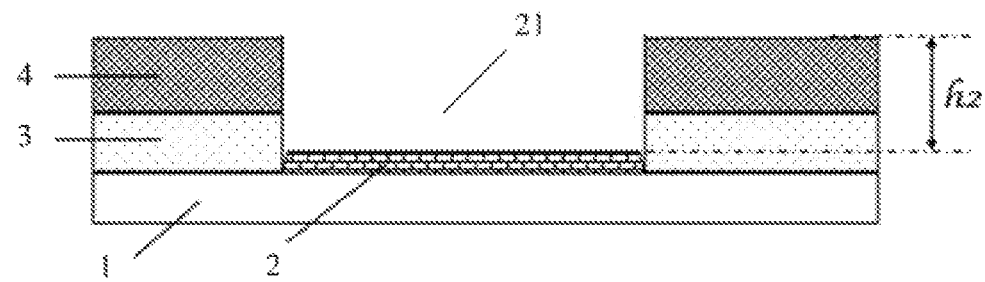
FIG. 4B is a cross section view of a position aligning region in FIG. 4A, taken along A-A line.

As shown in FIGS. 4A and 4B, a film 40 (with a thickness greater than 2.5 µm) of a planarization layer is coated on the array substrate 1 coated with the color filter layer 3. The film of the planarization layer 4 may flatten, such as, a pixel region. The position aligning marks 21 in the planarization layer 4 may be formed in a hollowed-out structure and are also accurately aligned with the reference position aligning marks 2. In the structure of the display substrate as shown in FIG. 4B, the position aligning region includes a structure including the array substrate 1, the reference position aligning marks 2, the hollowed-out position aligning marks 21 in the color filter layer 3 and the hollowed-out position aligning marks 21 in the planarization layer 4, which define hollowed-out position aligning marks 21 with a depth of h2.

As shown in FIGS. 5A and 5B, after preparing the planarization layer 4, a film 50 (with a thickness of about 1 µm) of a black matrix is coated, such that the position aligning region 20 provided with the reference position aligning marks 2 is also covered by the film 50 of the black matrix. In the structure of the display substrate as shown in FIG. 5B, the position aligning region includes a structure including the array substrate 1, the reference position aligning marks 2, the hollowed-out position aligning marks 21 in the color filter layer 3, the hollowed-out position aligning marks 21 in the planarization layer 4 and the film 50 of the black matrix, which finally defines hollowed-out position aligning marks 21 with a depth of h (which is equal to (h2−1 µm)) greater than 3 µm.

It is appreciated that the additional layer of the planarization layer 4 is provided as an example, not limitation, in case that the color filter layer 3 with a relative great thickness is provided with the hollowed-out position aligning marks in position aligning region 20. That is, the planarization layer 4 may be not provided with the hollowed-out position aligning marks, or, may be replaced by other layer or layered structure except the color filter layer 3 on the color filter substrate, provided that the depth of the hollowed-out position aligning marks having a pattern may fall into the detectable accuracy rating of the surface profile detecting method and is not limited herein.

In the embodiment of the display substrate, the control portion includes a thin film transistor including a multilayer layered structure which is obtained by forming a pattern of respective layers successively through patterning processes, upon aligning the position aligning marks in the respective layer successively. As the layers of the thin film transistor generally have a rather small thickness (about several hundreds of angstroms) and pattern of respective layers have a rather small size, position aligning marks in a hollowed-out structure may be not formed in each of the layers (because the position aligning marks would not be distinctive even though the hollowed-out structure is formed).

The embodiment may solve the problem that position aligning marks may be not identified after the black matrix has been formed on the array substrate in COA technology, and provides a display substrate and a method of manufacturing the same based on COA technology, in which the display substrate includes position aligning marks for identifying the black matrix. Specifically, according to the embodiment, the problem is solved by forming the hollowed-out structure position aligning marks having a pattern on the color filter layer (and even on the planarization layer) of the display substrate and then coating a film of the black matrix so as to, at the position aligning marks, obtain a structure with a rather great depth up to more than 3 μm, which may be detected through the surface profile detecting method. That is, position alignment may be performed by identifying the position aligning marks by means of the height difference at edge of the pattern thereof, thereby solving the problem that the black matrix cannot be aligned accurately in COA technology and ensuring correct alignment of sub-pixel.

Another embodiment of the present invention provides a display device including the display substrate according to the above embodiment.

The display device may be a liquid crystal panel, an electronic paper, a mobile phone, a tablet computer, a television, a display, a notebook computer, a digital photo frame, a navigating instrument or other product or component having a function of display.

With the display substrate, the method of manufacturing the position aligning marks with a rather great depth may ensure accurate alignment during patterning process for the black matrix, accurate alignment of sub-pixel and display performance of the display device.

It is appreciated that the above embodiments are exemplary embodiments that are provided to only describe principle of the invention. However, the present invention is not limited to those. Any modification, equivalent, improvement, etc. made within the spirits and principle of the present invention, of the embodiments of the present invention should be included in the protective scope of the invention.

The invention claimed is:

1. A display substrate, comprising:
   a control portion; and
   a color portion that is disposed over the control portion and comprises a color filter layer and a black matrix,
   the control portion and the color portion both comprising position aligning regions at corresponding positions and further comprising position aligning marks provided in the position aligning regions,
   wherein the black matrix is located on top of the color portion and at least the position aligning marks in the color filter layer of the color portion are formed in a hollowed-out structure.

2. The display substrate as claimed in claim 1, wherein a thickness of a part of the color portion at the position aligning mark with the hollowed-out structure is half of an overall thickness of the color portion.

3. The display substrate as claimed in claim 1, wherein the thickness of the part of the color portion at the position aligning mark with the hollowed-out structure is greater than 3 μm.

4. The display substrate as claimed in claim 1, further comprising an additional layer that comprises a planarization layer arranged between the color filter layer and the black matrix, the planarization layer comprising position aligning marks with the hollowed-out structure.

5. The display substrate as claimed in claim 4, wherein a thickness of the color filter layer is in a range from 2 μm to 3 μm, a thickness of the black matrix is in a range from 0.8 μm to 1.2 μm and a thickness of the planarization layer is greater than 2.5 μm.

6. The display substrate as claimed in claim 1, wherein the position aligning mark with the hollowed-out structure have a cruciform shape or T-shaped shape, when viewed in a direction perpendicular to the color filter layer.

7. The display substrate as claimed in claim 1, wherein the black matrix is made of a resin material with a high optical density, which is in a range greater than or equal to 4.

8. The display substrate as claimed in claim 1, wherein the control portion comprises a thin film transistor having a multilayer layered structure, the multilayer layered structure being formed by providing patterns of respective layers successively through patterning processes by aligning the respective layers by means of the position aligning marks.

9. A method of manufacturing a display substrate, comprising steps of:
   1) forming a reference layer on a substrate, and forming a pattern including reference position aligning marks from the reference layer;
   2) forming a pattern of a color filter layer on the substrate, on which the reference position aligning marks are formed, and the pattern of the color filter layer includes position aligning marks corresponding to the reference position aligning marks, the position aligning marks of the color filter layer being formed in a hollowed-out structure;
   3) forming a pattern of black matrix on the substrate, on which the color filter layer is formed, wherein a material for forming the black matrix is filled into hollowed-out structure of the position aligning marks of the color filter layer such that the position aligning marks are capable of being identified by a profile detecting method during exposure process and alignment is performed.

10. The method as claimed in claim 9, further comprising a step of forming a planarization layer between step 2) and step 3), the planarization layer comprising position aligning marks corresponding to the reference position aligning marks and formed in a hollowed-out structure.

11. A display device, comprising the display substrate as claimed in claim 1.

* * * * *